(12) United States Patent
Boratav et al.

(10) Patent No.: US 7,409,839 B2
(45) Date of Patent: Aug. 12, 2008

(54) METHOD AND APPARATUS FOR MAKING A GLASS SHEET

(75) Inventors: Olus Naili Boratav, Ithaca, NY (US); Steven Roy Burdette, Horseheads, NY (US); David John Ulrich, Burdett, NY (US)

(73) Assignee: Corning Incorporated, Corning, NY (US)

( * ) Notice: Subject to any disclaimer, the term of this patent is extended or adjusted under 35 U.S.C. 154(b) by 76 days.

(21) Appl. No.: 11/406,466

(22) Filed: Apr. 17, 2006

(65) Prior Publication Data
US 2006/0242994 A1     Nov. 2, 2006

Related U.S. Application Data

(60) Provisional application No. 60/676,469, filed on Apr. 29, 2005.

(51) Int. Cl.
*C03B 15/02*   (2006.01)

(52) U.S. Cl. .............................. 65/199; 65/193; 65/201; 65/258

(58) Field of Classification Search .................. 65/188, 65/193, 90, 91, 99.2, 182.3, 199, 201, 206, 65/258
See application file for complete search history.

(56) References Cited

U.S. PATENT DOCUMENTS

| | | | |
|---|---|---|---|
| 3,451,798 A | 6/1969 | Simon | 65/199 |
| 3,537,834 A | 11/1970 | Simon | 65/199 |
| 3,589,887 A | 6/1971 | Ward et al. | 65/195 |
| 4,214,886 A | 7/1980 | Shay et al. | 65/121 |
| 2004/0055338 A1 | 3/2004 | Helfinstine et al. | 65/374.13 |
| 2005/0050923 A1 | 3/2005 | Grzesik et al. | 65/135.6 |

FOREIGN PATENT DOCUMENTS

| | | |
|---|---|---|
| JP | 2004203691 | 7/2004 |
| JP | 2004284843 | 10/2004 |

*Primary Examiner*—Steven P. Griffin
*Assistant Examiner*—DeMaris R. Wilson
(74) *Attorney, Agent, or Firm*—Kevin M. Able

(57) ABSTRACT

In the formation of sheet glass by the overflow downdraw process, the width of usable sheet glass is maximized by downwardly flowing edge portions of the sheet over web-like members and thereafter over extensions which intersect with and are downwardly inclined relative to the web-like members to thin edge portions of the glass flow and maintain sheet width. The extension members are preferably removably attached to the web-like members, greatly facilitating replacement of the more easily damaged extension members.

18 Claims, 4 Drawing Sheets

METHOD AND APPARATUS FOR MAKING A GLASS SHEET

This application claims priority, under 35 U.S.C. 119 (e). to U.S. Provisional Application No. 60/676,469 filed on Apr. 29, 2005, the contents of which are incorporated herein by reference in their entirety.

BACKGROUND OF THE INVENTION

1. Field of the Invention

The present invention relates to an apparatus for forming glass, more particularly an apparatus for forming a glass sheet.

2. Technical Background

The manufacture of sheet glass by downwardly flowing molten glass over a forming wedge is well known in the art. However, in practice it was found that the actual width of usable sheet produced was substantially less than the maximum width of usable glass sheet which theoretically could be obtained, as predicated by the longitudinal length of the forming wedge. That is, it has been found that when the molten glass flows along the underside of a negatively inclined surface, such as the downwardly converging surfaces of a forming wedge, the width of the glass stream contracts and pulls inwardly from the vertical ends of the wedge.

This lateral movement of the molten glass produces a bead or thickening portion along the edge of the sheet—the edge head.

The thickened sections on the edges of the sheet not only decrease the amount of usable uniform thickness sheet glass that can be obtained from a given width of drawn sheet, but also limit the speed at which the sheet may be drawn. That is, since the sheet is annealed as a continuous process immediately after formation, and the time required for sheet glass to reach an acceptable strain level in passing through the annealing portion of the process is directly proportional to the thickness of the glass, sheet having thickened edge portions requires more annealing time, thus limiting the maximum rate of sheet formation.

In the past it has been suggested that the narrowing of the width of glass sheet formed by the downdraw process may be prevented by utilizing rollers or edge cooling.

However, this has not been entirely satisfactory since rolling merely attempts to reduce the thickness of the beaded portion without attempting to correct the cause or source of the bead, and cooling tends to enlarge the formation of beaded edges, which as previously indicated are detrimental in the formation of sheet glass. Further, high viscosities adjacent the edges of the sheet flow actually tend to create a pull-in or narrowing of the glass to a much greater extent than do low viscosities. However, should the edges be chilled sufficiently to set up the glass, additional detrimental effects are produced in the form of sheet warpage and undesirable stresses.

Prior art methods of increasing sheet width have employed a web surface portion extending between the downwardly converging surfaces of the forming wedge and a projecting edge surface portion which aided in increasing the width of the drawn glass sheet. U.S. Pat. No. 3,451,798 discloses such a web surface portion which terminates at its lowest extent at the horizontal plane passing through the root, the line along which the downwardly converging surfaces of the forming wedge meet. U.S. Pat. No. 3,537,834 discloses a forming apparatus comprising a web surface portion which, at its lowest point may be extended below the root.

In one prior art apparatus, illustrated in FIG. 1, an overflow trough 10 comprising converging forming surfaces includes multiple edge directors 12. Each edge director 12 comprises two main portions: a projecting edge surface portion 14 which intersects forming surface portions of the trough along its vertical extent, and a web or filleted surface portion 16 which extends between the projecting edge surface portion 14 and one of the downwardly inclined converging surface portions. However, web surface portion 16 does not extend below the lower apex formed by the converging forming surfaces.

In another prior art apparatus, shown in FIG. 2, web surface portion 20 extends below the lower apex, or root, as indicated by point 22. However, whether web surface portion 20 is planar, curvilinear or frusto-conical in shape, the extended web surface portion does not break or kink (i.e. demonstrate an abrupt change in direction) along its downward length.

Although the prior art devices described above have been useful to extend the width of glass sheet drawn from overflow troughs, devices capable of still further improvement in sheet width are needed. Unfortunately, there are practical limits to the length of the forming wedge without incurring problems associated with sagging of the wedge. Thus, there is a need to further increase the width of glass sheet drawn from a forming wedge which does not entail increasing the length of the forming wedge itself.

The present invention virtually obviates the problems of reduction in sheet width and bead formation heretofore encountered when forming sheet glass by an overflow downdraw process by providing the forming wedge with edge director projections having web portions and extension portions which intersect with the web portions.

Each edge director has a projecting edge surface portion which extends along edge portions of the forming surface of the wedge, and a web or filleted portion which extends between such projecting edge portion and an adjacent downwardly inclined forming surface portion.

The web or fillet portion and the extension surface portion of each edge director provides a wetted length in the horizontal direction which is greater than the horizontal length of the negative-angle wedge surface which it intercepts, and accordingly spreads out the flowing glass and decreases its thickness adjacent to its ends before the glass is drawn off an edge of the extension surface portion to inhibit bead formation.

In an embodiment of the invention, an apparatus for drawing sheet glass is disclosed which includes a forming wedge having a pair of downwardly inclined forming surface portions. The downwardly inclined forming surface portions converge at the bottom of the forming wedge to form a root and define a glass draw line therealong. A web surface portion for intercepting and thinning the flow of glass along edge portions of the forming surfaces intersects at least one of the forming surfaces. An extension surface portion intersects with and extends below the web surface portion, and an outwardly directed normal to the extension surface portion has a downwardly directed component (i.e. vector component). Preferably, the first extension surface portion is detachably cooperative with the first web surface portion. That is, the first extension surface portion can be removed. The first extension surface portion may be attached to the first web surface portion via one or more dovetail joints, for example, thereby facilitating detachment of the first extension surface portion from the web surface portion. Alternatively, pins may be embedded within the first extension surface portion which are sized to cooperate with corresponding receiving orifices in the web surface portion. Beneficially, the first extension surface portion may be removed my glass is flowing over the forming surfaces, thereby minimizing down time of the glass sheet forming operation.

Preferably, the extension surface normal forms an angle α with the web surface portion normal in a vertical plane through the web portion surface and the extension surface portion greater than about 15° and less than about 30°.

An inner edge of the extension surface portion preferably intersects a vertical plane intersecting the root.

In another embodiment an apparatus for drawing sheet glass is provided including a forming wedge having a pair of downwardly inclined forming surface portions, the downwardly inclined forming surface portions converging at the bottom of the forming wedge forming a root and defining a glass draw line therealong. An edge director extends along vertical edge portions of the forming surfaces, the edge director for intercepting and thinning the flow of glass along edge portions of the forming surfaces having a web surface portion which intersects with the forming surfaces. An extension surface portion intersects with and extends below the web surface portion. An outwardly directed normal to the extension surface portion has a downwardly directed (vector) component.

Preferably, the first extension surface portion is detachably cooperative with the first web surface portion. The first extension surface portion may be attached to the first web surface portion via one or more dovetail joints, for example. Alternatively, pins may be embedded within the first extension surface portion which are sized to cooperate with corresponding receiving orifices in the web surface portion.

Preferably, the normal to the web surface portion and the normal to the extension surface portion form an angle β in a vertical plane passing through both the web surface portion and the extension surface portion between 15° and 30°.

In still another embodiment of the invention, a method of making a glass sheet is provided comprising flowing molten glass over a pair of downwardly inclined forming surface portions comprising a forming wedge, the downwardly inclined forming surface portions converging at the bottom of the forming wedge, flowing the glass sheet over a web surface portion intersecting with at least one of the forming surface portions, and flowing the glass sheet over an extension surface portion intersecting the web surface portion, the web surface portion having an outwardly directed surface normal with a downwardly directed (vector) component.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

DETAILED DESCRIPTION

Figure 1:
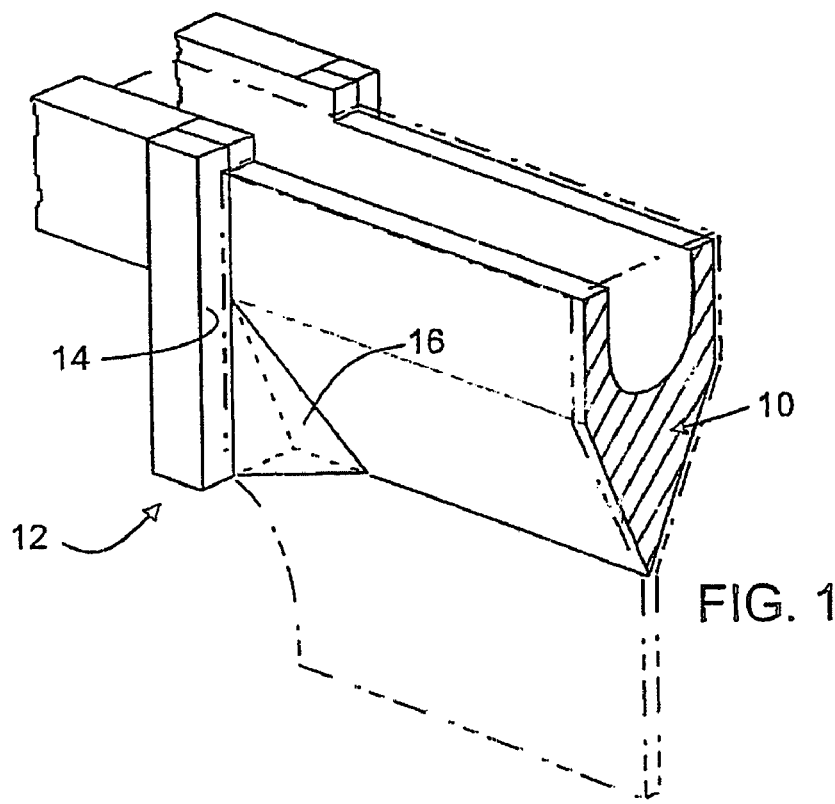
FIG. 1 is a cutaway perspective view of a prior art edge director.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Figure 3:
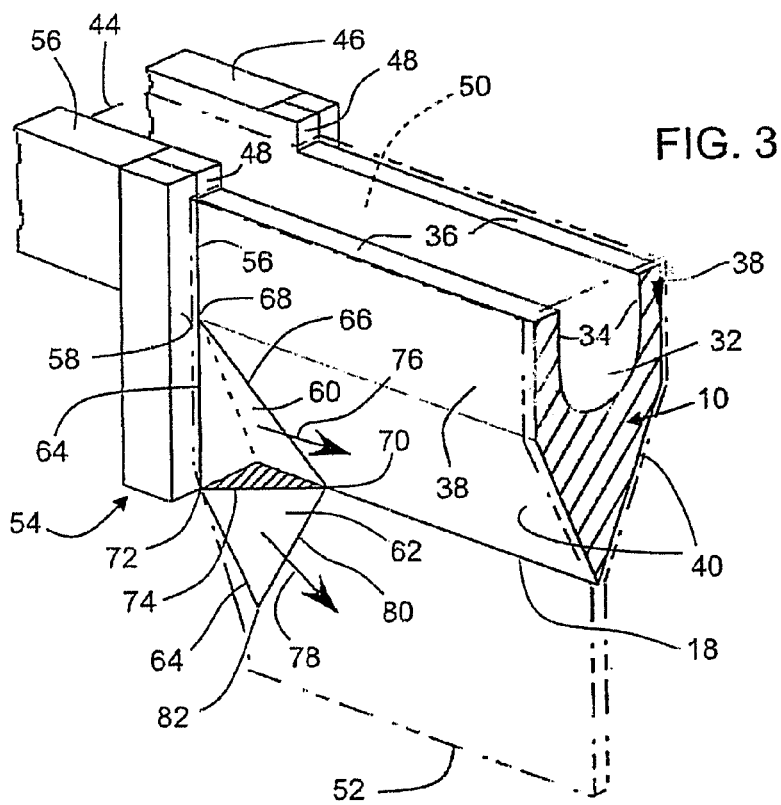
FIG. 3 is a cutaway perspective view of an apparatus for drawing glass sheet according to an embodiment of the present invention showing the structure of the edge directors according to an embodiment of the present invention.

An embodiment of an inventive apparatus for the overflow down draw of pristine glass sheets according to the present invention is shown in FIG. 3. As illustrated in FIG. 3, an overflow trough member of forming wedge 10 includes an upwardly open channel 32 bounded on its longitudinal sides by wall portions 34, which terminate at their upper extent in opposed longitudinally-extending overflow weirs or lips 36. The weirs or lips 36 communicate with opposed outer sheet forming surfaces of wedge member 10. As shown, wedge member 10 is provided with a pair of substantially vertical forming surface portions 38 which communicate with lips 36, and a pair of downwardly inclined converging surface portions 40 which terminate at a substantially horizontal lower apex or root 18 forming a straight glass draw line.

Figure 4:
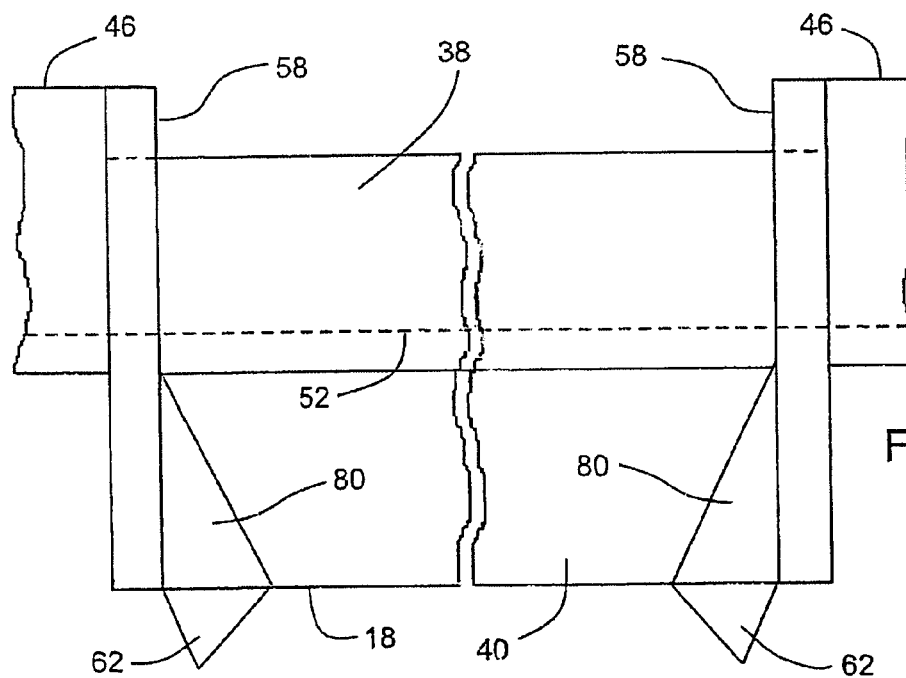
FIG. 4 is a side view of the apparatus of FIG. 3.

Molten glass 44 is fed into channel 32 by means of delivery passage 46 communicating with channel 32. The feed into channel 32 may be single ended or, if desired, double ended as shown in FIG. 4. A pair of restricting dams 48 are provided above overflow lips 36 adjacent each end of channel 32 to direct the overflow of the free surface 50 of molten glass 44 over overflow lips 36 as separate streams, and down opposed forming surface portions 38, 40 to root 18 where the separate streams, shown in chain lines, converge to form a sheet of virgin-surfaced glass 52.

As shown in FIGS. 3 and 4, and in accordance with an embodiment of the present invention, a pair of edge directors or correctors 54 are provided on each side and at each longitudinal end of the forming wedge so that one extends along the vertical edge 56 of each longitudinal end of the wedge. Accordingly, four edge directors are provided for each forming wedge, with one at each vertical corner so that two such edge directors are oppositely disposed at each longitudinal end of the forming wedge. The edge directors 54 are comprised of three main portions, including a projecting edge surface portion 58 which intersects the longitudinal ends of the forming surface portions of the wedge along their vertical extent, a web or filleted surface portion 60 which extends between and communicates (intersects) with the projecting edge surface portion 58 and one of the downwardly inclined converging surface portions 40, and an extension surface portion 62 which extends below the web portion.

Web surface portion 60 intersects edge surface portion 58 along intersection line 64, and also intersects the inclined forming surface portion 40 along intersection line 66. The intersection of web surface portion 60 with edge surface portion 58 and inclined forming surface portion 40 extends from point 68 where the top of the downwardly inclined forming surface intersects the projecting edge surface portion 58. Intersection line 66 extends diagonally downward from point 68 to point 70 spaced inwardly from the projecting edge surface portion along the root or apex of the forming wedge. Similarly, intersection line 64 extends downward from point 68 to point 72 on edge surface portion 58. Preferably, point 72 lies in the horizontal plane passing through root 18. However, in some embodiments, point 72 may lie either above or below the horizontal plane. The bottom edge of web portion 60 lies on line 74 extending from point 70 to point 72. As shown in FIG. 3 and described herein, a normal 76 to web surface portion 60 is preferably horizontal everywhere on web surface portion 60. That is, surface normal 76 preferably has no vertical component and web surface portion 60 is everywhere vertical. Although FIG. 3 shows a planar surface for purposes of illustration, web surface portion 60 may be curved or planar, or a combination thereof. In a preferred embodiment, web surface portion 60 is substantially planar.

Figure 5:
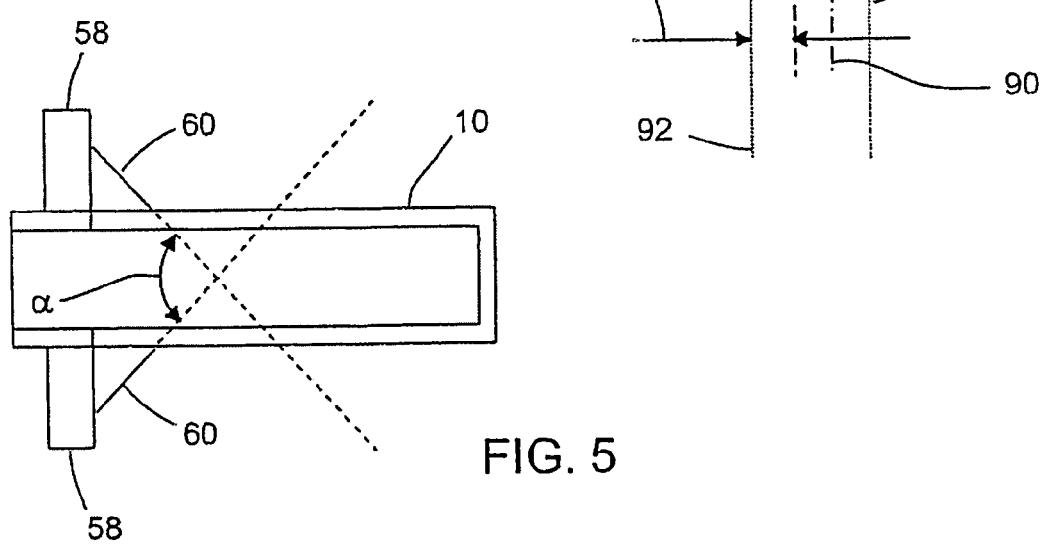
FIG. 5 is a top-down view of the apparatus of FIG. 3 showing the angle formed by opposing web surface portions.

It was previously noted that, in accordance with the present embodiment, wedge member 10 comprised a plurality of edge directors, specifically, a pair of edge directors 54 are provided on each side of the forming wedge, with one at each vertical corner so that two such edge directors are oppositely disposed at each longitudinal end of the forming wedge. In the instance where each web surface portion is substantially planar, and as shown in FIG. 5, an imaginary plane parallel to a first web surface portion located at one end of the forming wedge preferably forms an angle α of about 90° with an imaginary plane parallel to a second web surface portion which is disposed opposite the first web surface portion, but on the other side of the forming wedge, i.e. both web surface portions being located at the same end of the forming wedge but on opposite sides.

Figure 6:
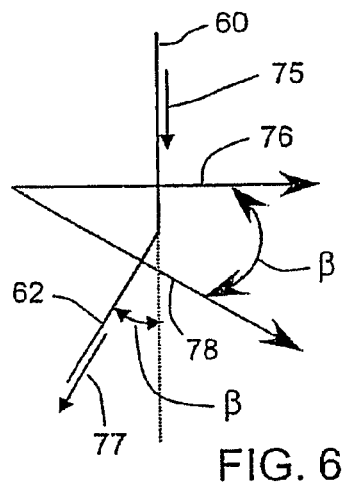
FIG. 6 is a vector diagram of the angle between a normal to a web surface portion and a normal to an extension surface portion of the apparatus of FIG. 3, both normals lying in a vertical plane through the extension surface and the web surface.

Returning to FIG. 3, extension surface portion 62 intersects web surface portion 60 along line 74, which forms a shared edge between web surface portion 60 and extension surface portion 62, and extends downwardly below the horizontal plane containing root 18. In the instance where line 74 is a straight line (e.g. web surface portion 60 and extension surface portion 62 are planar) line 74 is preferably horizontal. However, as described above, line 74 may be angled relative to the horizontal plane in some embodiments. As in the case of web surface portion 60, although FIG. 3 shows a planar surface for purposes of illustration only, extension surface portion 62 may be curved or planar, or a combination thereof. Preferably, extension surface portion 62 is substantially planar. An outwardly directed normal 78 to extension surface 62 has a downwardly directed component. By outwardly directed what is meant is a normal directed away from a vertical plane intersecting root 18. Preferably, and as best shown in FIG. 6, angle β between surface normal 76 and surface normal 78 lying substantially in a vertical plane through both web surface portion 60 and extension surface portion 62, is preferably less than about 30° but greater than about 15°; more preferably less than about 25° but greater than about 20°. Thus, the flow of glass over web surface portion 60 "breaks" at line 74 and changes direction as it flows onto and over extension surface portion 62. This can be seen from FIG. 5, where angle β represents the angular change in direction of the glass flow in the vertical plane containing surface normals 76, 78; from the flow over web surface portion 60, represented by arrow 75, to the flow over extension surface portion 62, represented by arrow 77.

To ensure that the sheet of flowing glass is formed substantially flat the inner edge 80 of web surface portion 60 forms a common line of intersection or draw line with the inner edge portion of an opposed web portion 60 on the opposite side of forming member 10, since both inner edges 80 lie in the vertical plane passing through root 18. Such inner edges 80 preferably form a common line extending downwardly from point 70 on root 18 to a lower most point 82 on line 80 within the vertical plane passing through the root.

Whereas extension surface 62 may be essentially a thick sheet of suitably-shaped refractory material, extension surface 62 preferably comprises a substantially three-dimensional body, wherein extension surface 62 is one side of a multi-sided body. That is, the body has comparable dimensions in three directions. For example, extension surface 62 may be a side of a polyhedron. The body (illustratively, an inverted three-sided pyramid in FIG. 3) may be hollow, but preferably includes a core of insulating material to slow the dissipation of heat by extension surface 62 with respect to the glass flowing over surface 62. For example, the body may include a core comprising insulating fiber, such as high alumina-content Saffil® fiber; however a denser refractory material (i.e. a material capable of enduring high temperature) such as zirconium, although more thermally conductive than less dense materials, may be used. While cooling of the glass sheet while flowing over the edge directors is not preferred, denser materials, such as zirconium, which increases heat conduction from the glass, advantageously provide a body having more structural integrity over which to clad a refractory covering, such as platinum or platinum alloys, and to support the glass flow.

Extension surface 62 may further include one or more heaters for minimizing heat loss by the glass flowing over the extension surface. The heaters may be distributed such that the temperature profile of the glass flow may be adjusted. In a more preferred embodiment, the web surface portion may also be backed with an insulating material, and may also contain heaters. That is, an insulating material may be used to fill the volume between the web surface portion and the converging surface portion behind it. The heaters may be mounted to the back of either or both of web surface portions 60 and extension surface portions 62, or in the case that a core is employed in either case, heating elements may be distributed within the core material. Such heaters may be individually controlled, so as to impart a pre-determined special temperature profile to the glass flow over surface portions 60, 62.

In view of the fact that each of the four edge directors utilized with a particular forming wedge will be identical, only one such edge director will be described with regard to each embodiment thereof.

As previously discussed, edge director 54, including portions 58, 60 and 62, may comprise a cast refractory or suitable refractory metal compositions, such as stainless steel, platinum, platinum-rhodium alloys, or other high temperature alloys.

The edge director in accordance with the present invention produces a maximum width glass sheet having a minimum amount of edge head. The edge director provides a projecting edge surface 58 for the edge portions of the molten glass flowing along the forming wedge, a web surface portion 60 for maintaining a flow of the molten glass adjacent such edge surface portion while thinning the edge portion of the flow, and an extension surface portion 62 for further thinning the glass flow and maintaining full sheet width.

Molten glass flowing downwardly along edge portions of converging forming surfaces 40 is intercepted by web surface portions 60 along their diagonal lines of intersection with the inclined forming surfaces. Edge portions of the downwardly flowing sheet are first guidably supported by the inclined forming surfaces, and then by web surface portions 60 of edge directors 54. The web surface portions function to maintain a full width and substantially vertical flow of glass down to the elevation of the bottom outer edge of the web portion.

The contour of the web surface portion provides a wetted length, which in a horizontal direction is greater than the length of the forming surface which it intercepts, and accordingly spreads out or thins the glass flowing thereover, thus actually decreasing the thickness of the longitudinal edges of the molten glass stream before it leaves the bottom edge of the web portion.

After leaving web surface portion 60, the glass flow then breaks at line 74 and flows at negative angle β with respect to web surface portion 60 as shown in FIG. 6 and described above. As central portions of the glass flow continue to converge along the common draw line formed by inner edges 80 and root 18, the diverging outer edge portions of the opposed extension surface portions cause the sheet to thin.

EXAMPLE

Figure 2:
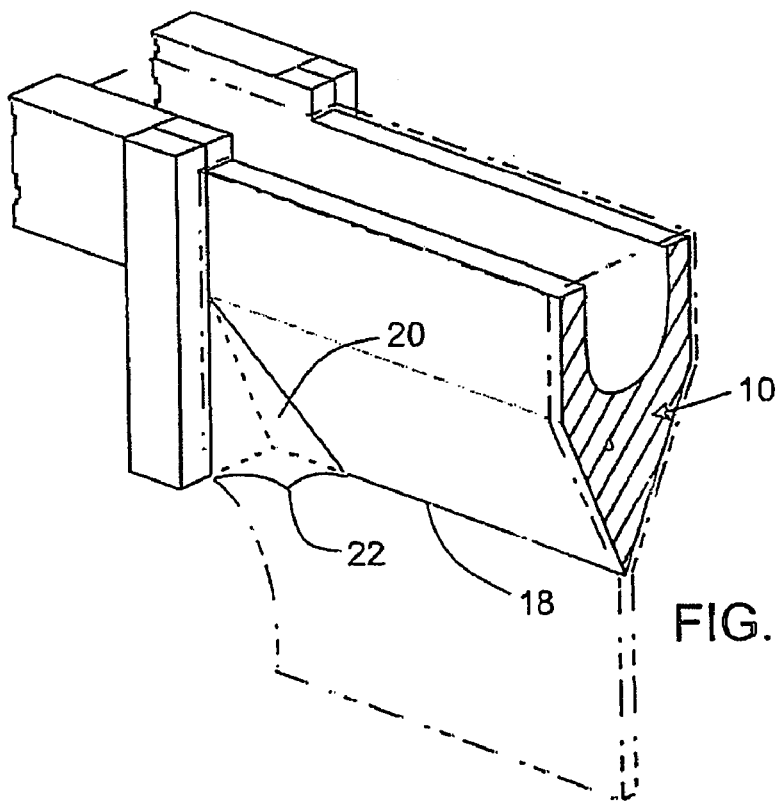
FIG. 2 is a cutaway perspective view of another prior art edge director.
Figure 7:
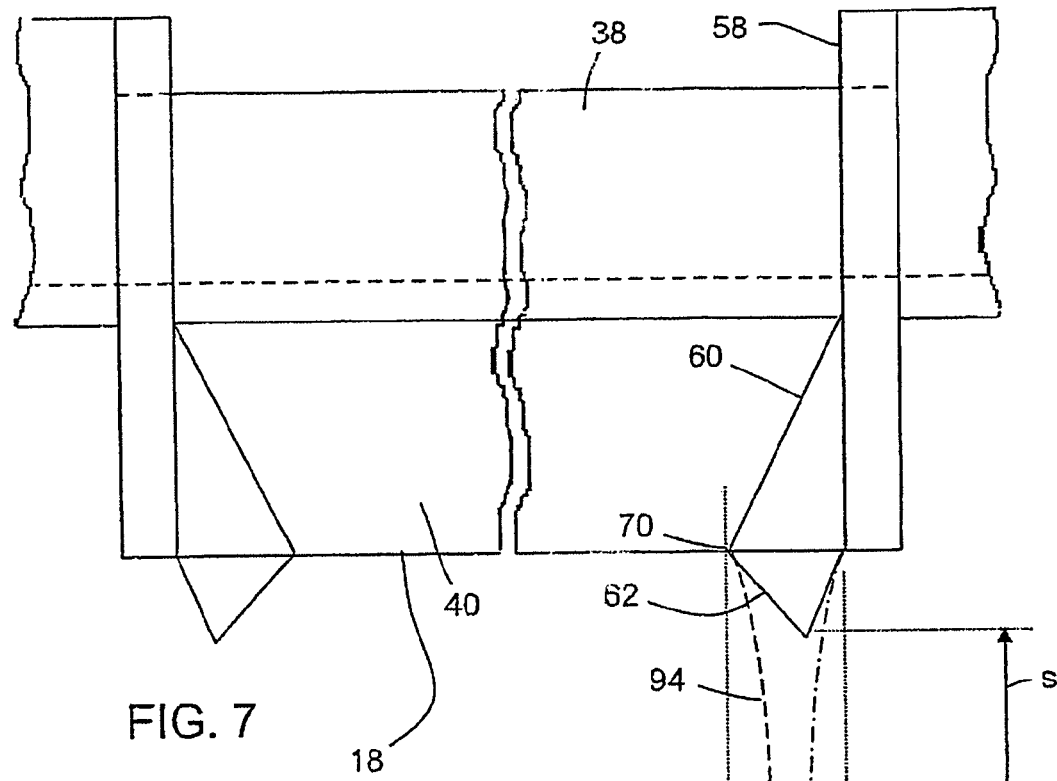
FIG. 7 is a side view of the apparatus of FIG. 3 shown with edge pulling rolls and measurement distances.

An embodiment of the present invention was experimentally demonstrated using a viscous oil as a substitute for molten glass and a scale model of a forming wedge as described herein. The length of the forming wedge was 165.1 cm. The dimensions of each web surface extension included a length of intersection line 64 of about 27.9 cm and a length of intersection line 74 of about 14.9 cm. The dimensions of each extension surface portion included a length of the edge along intersection line 74 of 14.9 cm, an angle between edge 74 and 60 of about 51°, an angle between edge 74 and edge 64 of about 71°, and an angle between edge 60 and 64 of about 58°. The oil had a viscosity of 13,930 Poise and a density of 905 kg/m$^3$ at a temperature of 22.2° C. A pair of counter-rotating opposed pulling rolls were located a distance s of 5.08 cm below the lowest point 82 of the extension surface portion (as measured to the top of the rolls) at each edge of the oil sheet and were simultaneously rotated in a direction which aided the downward flow of viscous oil. The oil was flowed at a rate of 306 lbs/hr. As shown in FIG. 7, the distance d from the inside surface of projecting edge surface 58 (i.e. line 88) to the edge 90 of the glass sheet at a pre-determined point below the pulling rolls was measured using both the web surface portion and the extension surface portion according to an embodiment of the present invention. The web surface portion and the extension surface portion both utilized planar surfaces in contact with the oil. A second measurement was made using the prior art configuration of FIG. 2, hereafter the "standard" configuration. The standard configuration utilized a web surface portion having a curved surface and which surface extended below the root without breaking. The measurement results are presented below in Table 1. Projecting edge surface portions were used during all measurements to control the flow of glass over forming surfaces 38, 40. Table 1 indicates that employing extension surface portion 62 of edge director 54 results in an increase in overall sheet width when compared to the standard configuration. Note that d (and therefore Δd) represents a measurement at one edge of the sheet.

TABLE 1

| Roller Speed (cm/min) | d with web and extension (cm) | d standard (cm) | Improvement (Δd) in cm |
|---|---|---|---|
| 37.34 | 5.08 | 5.08 | 0 |
| 61.47 | 5.08 | 5.72 | .64 |
| 219.71 | 5.08 | 6.35 | 1.27 |
| 307.59 | 5.08 | 6.35 | 1.27 |
| 527.30 | 5.08 | 6.35 | 1.27 |

To determine the increase in potentially useable sheet width, measurements of the distance D from a plurality of points on the glass surface below root 18 and on vertical line 92 passing through the farthest inside point of the web surface portion (i.e. point 70) to the demarcation of potentially useable glass were also taken as an indication of the useable sheet width along one edge of the sheet. Those skilled in the art will appreciate that by potentially useable glass the inventors herein are referring to glass which is potentially useful for commercial use in the intended application, such as for liquid crystal display or organic liquid crystal display production. As used herein, potentially useable glass refers to glass which has not contacted the edge directors. The line of demarcation 94 for potentially useable glass can be determined by inserting a marker, such as a dye or discrete object for example, into the flow of glass at point 70. In the present instance, discrete markers were placed in the oil flow at point 70. A camera orthogonally aligned to the oil flow was used to photograph the flow as the markers descended. Measurements were conducted against the photographs, with appropriate scaling. In Table 2, a negative value indicates that the useable glass demarcation 94 is to the left of line 92 while a positive value indicates that demarcation 94 is to the right of line 92. Measurements were taken while employing edge directors according to the description above and compared to measurements using the standard configuration. When compared with the results from Table 1, the increase in potentially useable glass is significantly greater than the increase in sheet width. That is, while edge directors according to the present invention are capable of increasing the sheet width for a given forming surface length, the gain in useable glass is even greater.

TABLE 2

| Distance below root (cm) | D with web and extension (cm) | D standard (cm) | Increase in Useable Sheet Width (cm) |
|---|---|---|---|
| 8.63 | 0.71 | −1.40 | 2.11 |
| 12.27 | 1.04 | −1.75 | 2.79 |
| 15.77 | 0.71 | −2.62 | 3.33 |
| 19.28 | 0.33 | −3.15 | 3.48 |
| 22.78 | 0 | −3.84 | 3.84 |

Figure 8:
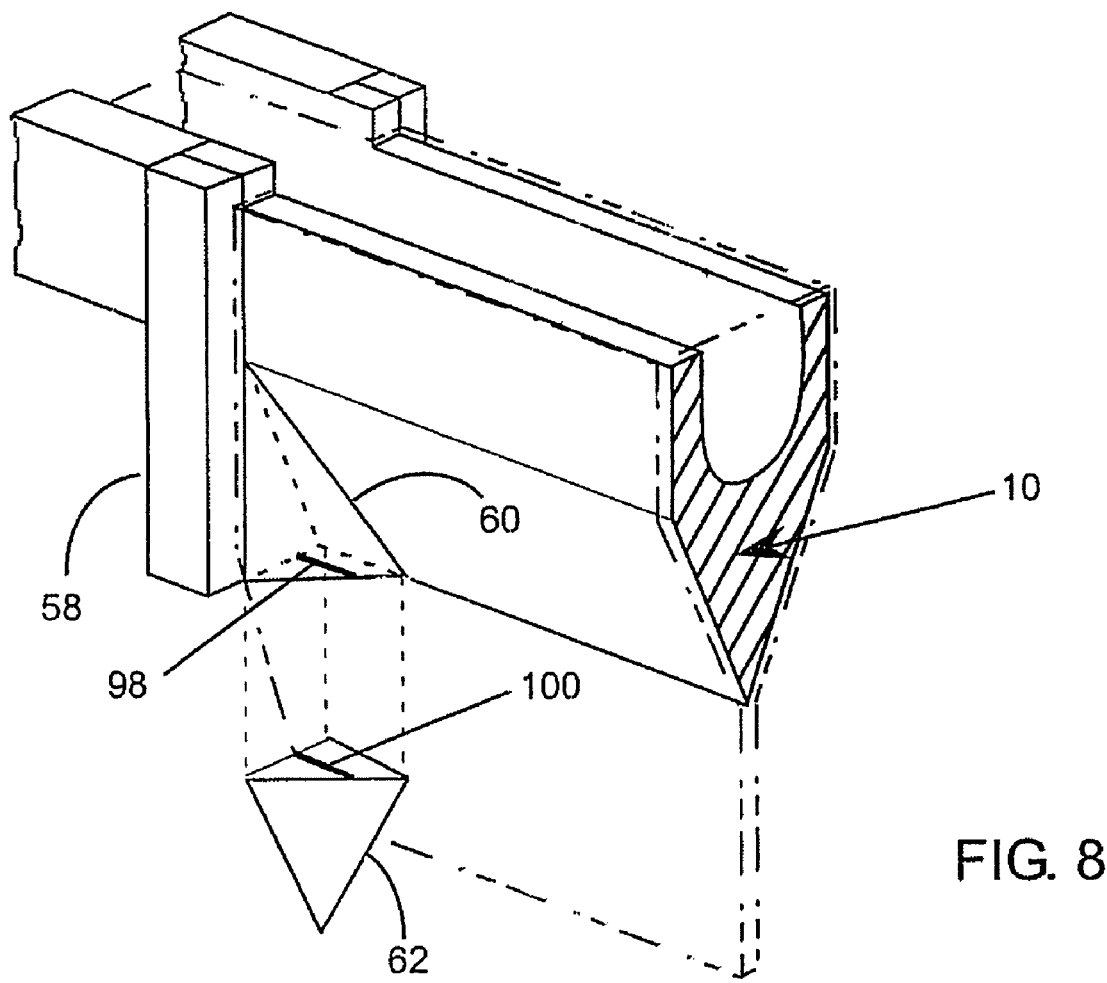
FIG. 8 is a cutaway perspective view of an apparatus for drawing glass sheet according to an embodiment of the present invention showing the removable extension surface portion of the edge director.
Figure 9:
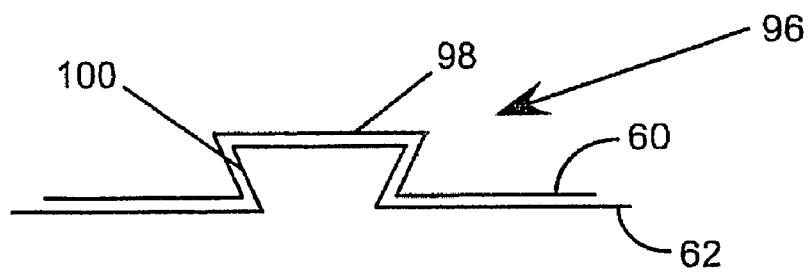
FIG. 9 is a cross sectional view of an exemplary dovetail joint which may be used to removably attach the extension surface portion to the web surface portion of the edge director.

In still another embodiment, the edge directors according to the preceding embodiments of the invention comprise a first extension surface portion 62 which is removably attached to the first web surface portion 60, as best shown in FIG. 8. FIG. 8 shows first extension surface portion 62 separated from first web surface portion 60. The first extension surface portion may be attached to the first web surface portion via one or more dovetail joints, for example, such as the exemplary dovetail joint 96 shown in FIG. 9 and comprising male and female components, 98, 100, respectively. The male and female components of the dovetail joint or joints are interchangeable between web surface portion 60 and extension surface portion 62 of the inventive edge director. However, preferably female dovetail component 98 is machined into web surface portion 60 and male dovetail component 100 is machined into extension surface portion 62. In an alternative embodiment, pins (not shown) may be used to attach extension surface portion 62 to web surface portion 60, the pins preferably being embedded within first extension surface portion 62 and sized to fit within receiving orifices in web surface portion 60. If pins are used, it is desirable that means be provided to secure or clamp the extension surface portion to the web surface portion. The clamping means may comprise any suitable method known in the art, such as the use of C-clamps, or their equivalent, which may be clamped to flanges (not shown) on non-glass-bearing surfaces of the extension and web surface portions.

In a normal production environment, damage may occur to the edge directors, and in particular to extension surface portion 62 which extends below root 18. Repair of the damaged section typically requires stoppage of the production activity and cooling down of the forming wedge. Once a repair has been made, the forming wedge must be re-heated to an appropriate operating temperature in such a manner as to avoid thermal stress damage to the forming wedge. The entire cooling down-repair-reheating cycle can extend for a significant amount of time, during which time the production line is unable to produce useable glass. Advantageously, by making extension surface portion 62 removable, repairs to the edge directors may be made during operation of the forming wedge (i.e. glass production), therefore avoiding lengthy, and costly, shutdown periods. For example, the glass sheet may be manipulated, such as by changing flow rates, such that the sheet recedes from the ends of the forming wedge and ceases to flow over the web and extension surface portions 60, 62. Extension surface portion 62 may be removed from web surface portion 60, such as by disengaging one or more dovetail joints as is known in the art. Once repairs have been made to the damaged extension surface portion (or the damaged extension surface portion exchanged for a new extension surface portion), the repaired section may then be re-attached to the appropriate web surface portion.

Use of a detachable/removable extension surface portion may beneficially facilitate the machining of forming wedge 10 and those portions of the edge directors above root 18 from a singe piece of material. For example, forming wedge 10, restricting dams 48, web surface portions 60 and projecting edge surface portions 58, or subsets thereof, may be machined out of a single piece of refractory material, greatly simplifying construction of the forming wedge/edge directors. That portion of the forming apparatus most susceptible to damage, i.e. extension surface portions 62, may then be attached and/or removed as necessary.

In the case of dovetails as the method of attaching extension surface portion 62 to the web surface portion 60, it is preferable (although not necessary) for ease and safety reasons, that the dovetails run substantially parallel to a longitudinal axis of the forming wedge so that removal and/or replacement of the extension surface portion is performed from "outside" the forming wedge. That is, from beyond the ends of the forming wedge such that a safe distance may be maintained from glass which may continue to flow over at least a portion of weirs 36.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for drawing sheet glass comprising:
    a forming wedge having a pair of downwardly inclined forming surface portions, the downwardly inclined forming surface portions converging at the bottom of the forming wedge forming a root and defining a glass draw line therealong;
    a first web surface portion communicating with at least one of the forming surfaces for intercepting and thinning the flow of glass along edge portions of the forming surfaces;
    a first extension surface portion intersecting with and extending below the first web surface portion; and
    wherein an outwardly directed normal to the first extension surface portion has a downwardly directed component.

2. The apparatus according to claim 1 wherein the first extension surface normal forms an angle $\alpha$ with the first web surface portion normal in a vertical plane containing the first web surface portion and the first extension surface portion between about 15° and about 30°.

3. The apparatus according to claim 1 wherein an inner edge of the first extension surface portion lies in a vertical plane intersecting the root.

4. The apparatus according to claim 3 wherein the inner edge of the first extension surface portion intersects an inner edge of a second extension surface portion, the intersection of the inner edges lying in the vertical plane intersecting the root.

5. The apparatus according to claim 1 wherein the first web surface portion is substantially planar.

6. The apparatus according to claim 1 wherein the first web surface portion is curved.

7. The apparatus according to claim 1 wherein the first extension surface portion is substantially planar.

8. The apparatus according to claim 1 wherein the first web surface portion and the first extension surface portion intersect along a straight line.

9. The apparatus according to claim 8 wherein the straight line is horizontal.

10. The apparatus according to claim 1 wherein the first extension surface portion comprises a side of a polyhedron.

11. The apparatus according to claim 1 wherein the first extension surface portion comprises a core of insulating refractory material.

12. The apparatus according to claim 1 wherein the first extension surface portion is removably attached to the web surface portion.

13. An apparatus for downwardly drawing sheet glass comprising:
    a forming wedge having a pair of downwardly inclined forming surface portions, the downwardly inclined forming surface portions converging at the bottom of the forming wedge forming a root and defining a glass draw line therealong;
    a first web surface portion communicating with at least one of the pair of forming surfaces for intercepting and thinning the flow of glass along edge portions of the forming surfaces, wherein a normal to the web surface portion is everywhere horizontal;
    a first extension surface portion intersecting with and extending below the first web surface portion, the first extension surface portion having an outwardly directed normal with a downwardly directed component; and
    wherein the first extension surface portion is detachably cooperative with the first web surface portion.

14. The apparatus according to claim 13 wherein the first extension surface portion cooperates with the first web surface portion via at least one dovetail joint.

15. The apparatus according to claim 13 wherein the first extension surface portion cooperates with the first web surface portion via pins.

16. The apparatus according to claim 13 wherein the forming wedge and the first web surface portion are formed from a single piece of refractory material.

17. The apparatus according to claim 13 wherein the apparatus further comprises a projecting edge portion.

18. The apparatus according to claim 17 wherein the forming wedge, the first web portion and the projecting edge portion are formed from a single piece of refractory material.

* * * * *